March 23, 1965     J. D. KLINE     3,175,103
ANALOG COMPUTER VOLTAGE FLUCTUATION COMPENSATOR
Filed Dec. 7, 1962
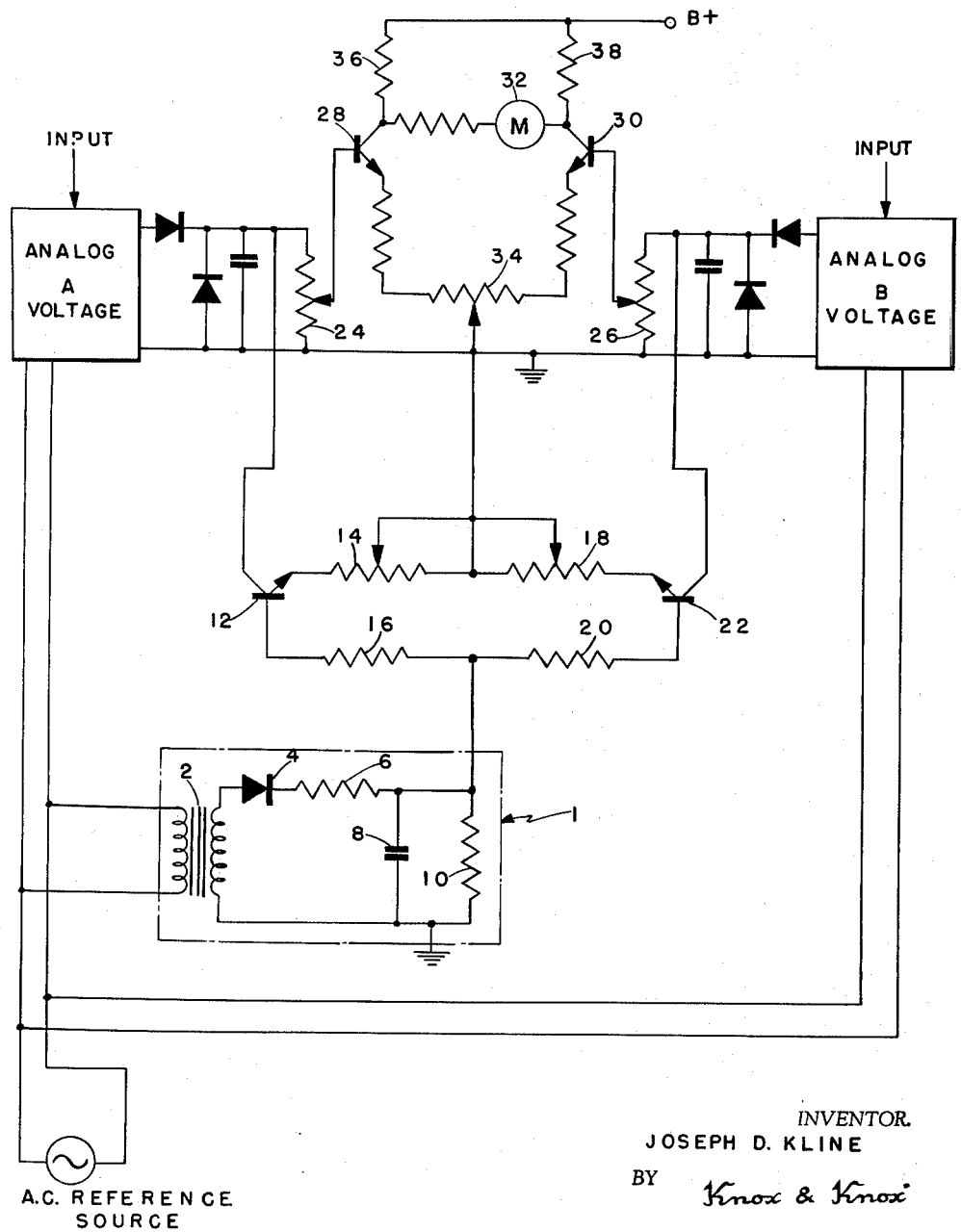
INVENTOR.
JOSEPH D. KLINE
BY Knox & Knox

United States Patent Office 3,175,103
Patented Mar. 23, 1965

3,175,103
ANALOG COMPUTER VOLTAGE FLUCTUATION COMPENSATOR
Joseph D. Kline, San Diego, Calif., assignor to Ryan Aeronautical Co., San Diego, Calif.
Filed Dec. 7, 1962, Ser. No. 242,959
3 Claims. (Cl. 307—88.5)

This invention relates generally to analog computer comparators and particularly to a method of compensation for line voltage fluctuations in electronic equipment such as analog computers and similar devices.

Background

The accuracy of many electronic devices, test and measuring equipment in particular, is dependent, among other factors, on a source of power that does not vary appreciably above or below its normal, effective voltage. Various kinds of voltage regulating and compensating devices are used in the art, each having either general or a specific application. The invention disclosed herein provides a unique method of compensating for reference line voltage flunctuations in an analog computer, although use of the method is not necessarily restricted to analog computer circuits.

In an analog computer, one analog voltage is compared with another to determine the difference between them. The two analog voltages are referred to the same A.C. reference voltage. Specific origin of the two analog voltages is not important to this disclosure. Analog A voltage, for example, might represent the pressure applied to a tank and analog B voltage might represent the pressure maintained in the tank, equality of the two analog voltages indicating a satisfactory condition.

Initially, with the A.C. reference voltage at standard, effective level, a meter and meter control circuit are calibrated to indicate percentage of error between two separate and distinct input analog voltages. Thereafter, the meter reading is accurate if the A.C. reference voltage remains at the same standard, effective level. If the A.C. reference voltage changes in level, however, the percentage of error changes in level, making the meter reading accurate only at zero error. It is necessary, therefore, to provide a means of compensating for A.C. reference voltage changes so that the accuracy of the meter reading remains unaffected when the A.C. reference voltage rises or falls above or below standard, effective level.

Objects

It is an object of this invention, therefore, to provide a transistorized electronic device that is capable of canceling the effect of A.C. reference voltage changes in the input analog voltage sections of the meter control circuit in an analog computer.

It is a further object of this inventaion to provide a transistorized electronic device that may be calibrated for initial accuracy in canceling the effect of A.C. reference voltage changes in said input analog voltage sections of the meter control circuit in an analog computer.

Finally, and more specifically, it is an object of this invention to provide a rectifier power supply with input connected to the same A.C. reference voltage as the said input analog voltages in an analog computer, said rectifier power supply to provide forward bias voltage for transistorized electronic current regulating devices to cancel the effect of A.C. reference voltage variations in the input analog voltage sections of said meter control circuit in said analog computer.

The attainment of these objectives will become apparent from the following description and accompanying drawing. The drawing is a schematic diagram of this invention that also shows the necessary connections in the meter control circuit of an analog computer.

Detailed Description

Referring to the drawing, half-wave rectifier generally indicated at 1, comprising transformer 2, diode 4, resistor 6, capacitor 8 and bleeder resistor 10, functions in a manner well known to the art. The voltage developed across bleeder resistor 10 provides forward bias in the base-emitter circuit of current regulating transistors 12 and 22. Variable resistors 14 and 18 in the emitter circuit of transistors 12 and 22 are used in conjunction with variable resistors 24, 26 and 34 in the analog computer meter control circuit for initial calibration of the meter and associated circuitry. The two input analog voltages have been indicated in the drawing as Analog A Voltage and Analog B Voltage. The collectors of transistors 12 and 22 are connected in parallel with bias resistors 24 and 26 and the base circuits of transistors 28 and 30 in the meter 32 control circuit of an analog computer, the remainder of which is not illustrated. The base current of transistors 28 and 30 is controlled by the rectified analog A and analog B voltages. The emitter-collector current of transistors 12 and 22 is controlled by the rectified voltage derived from circuit 1. As a result, current resulting from the rectified analog A and analog B voltage is divided, the current flowing in the emitter-collector circuit of transistors 12 and 22, thus regulating the bias current of transistors 28 and 30 when A.C. reference voltage variations occur.

The reference voltage for the analog A and analog B voltages and the input to the rectifier power supply are connected to the same A.C. reference source. An increase in the A.C. reference voltage, increases the reference voltage to the analog A and analog B voltages. Without compensation, current would flow through the base circuits of transistors 28 and 30, increasing the emitter-collector current of transistors 28 and 30, increasing the voltage drop across load resistors 36 and 38, changing the percentage of voltage difference across meter 32, and making the meter reading inaccurate. A decrease in the A.C. source voltage would cause an opposite effect, with resultant inaccurate readings. With compensation provided by my invention, the change in A.C. reference voltage changes the bias on transistors 12 and 22, regulates the emiter-collector current of transistors 12 and 22, and causes a relatively negligible shift in collector voltages between transistors 28 and 30.

As a result, the meter accuracy is not affected by A.C. reference voltage fluctuations. This is true because the input to said rectifier power supply and the reference voltage to the analog A and analog B voltages of said analog computer are connected to the same A.C. reference. A change in A.C. reference voltage therefore corrects for any change in analog voltages A and B caused by a change in reference voltage. The current through the collector-emitter circuits of transistors 28 and 30 controlled by said analog voltages A and B is regulated by the current drawn by transistors 12 and 22, which is controlled by the bias supplied by way of the rectifier from the A.C. reference voltage, and cancels the effect of any A.C. reference voltage variation. Consequently, the collector current of said transistors 28 and 30 in said meter circuit is regulated by the reference voltage variations, and the meter 32 provides accurate reading even at points other than zero error.

It is understood that minor variation from the form of the invention disclosed herein may be made without departure from the spirit and scope of the invention, and that the specification and drawings are to be considered as merely illustrative rather than limiting.

I claim:
1. In an electronic device that compensates for A.C. reference voltage fluctuations by canceling the effect of said fluctuations on circuitry connected to said device, the combination comprising:
   rectifying means connected to said A.C. reference voltage;
   a first analog voltage source connected to said A.C. reference voltage and having a rectified output;
   a second analog voltage source connected to said A.C. reference voltage and having a rectified output;
   first current regulating means with input connected to the output of said rectifying means and output connected in parallel with the rectified output of said first analog voltage;
   and second current regulating means with input connected to the output of said rectifying means and output connected in parallel with the rectified output of said second analog voltage.

2. In an electronic device that compensates for A.C. reference voltage fluctuations by canceling the effect of said fluctuations on circuitry connected to said device, the combination comprising:
   rectifying means connected to said A.C. reference voltage;
   a first analog voltage source connected to said A.C. reference voltage and having a rectified output;
   a second analog voltage source connected to said A.C. reference voltage and having a rectified output;
   first and second transistors, each having a collector, an emitter, and a base, the collectors of said first and second transistors being connected in parallel with the rectified output of said first and second analog voltages, respectively;
   first and second fixed resistors connected in series between the output of said rectifying means and the bases of said first and second transistors respectively.

3. The combination of claim 2 in which the rectified output of said first and second analog voltages is applied to the emitter-base circuits of third and fourth transistors, respectively, in the meter circuit of an analog computer, current in said emitter-base circuits flowing in parallel with the emitter-collector current of said first and second transistors, respectively.

References Cited by the Examiner
UNITED STATES PATENTS

| | | | |
|---|---|---|---|
| 2,694,172 | 11/54 | Trousdale | 328—267 |
| 3,005,162 | 10/61 | Leslie | 328—267 |
| 3,090,000 | 5/63 | Bentley | 307—88.5 |

DAVID J. GALVIN, *Primary Examiner.*